ically is obtainable when such products are synthesized by chemical processes. The present invention provides a method of converting an undesired isomer to the desired form in substantially quantitative yield and recovering a substantially pure fraction of the desired isomer.

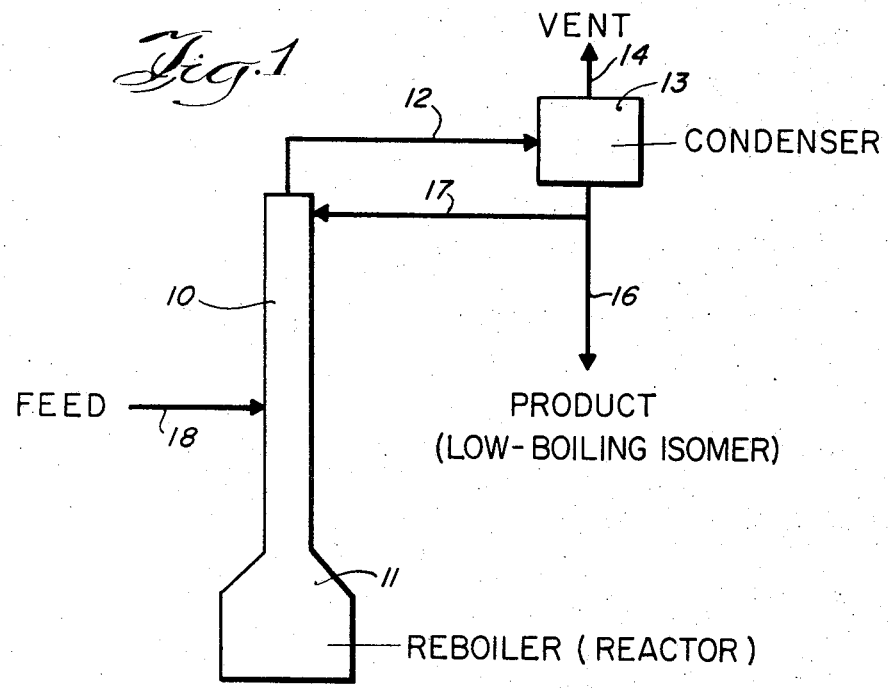
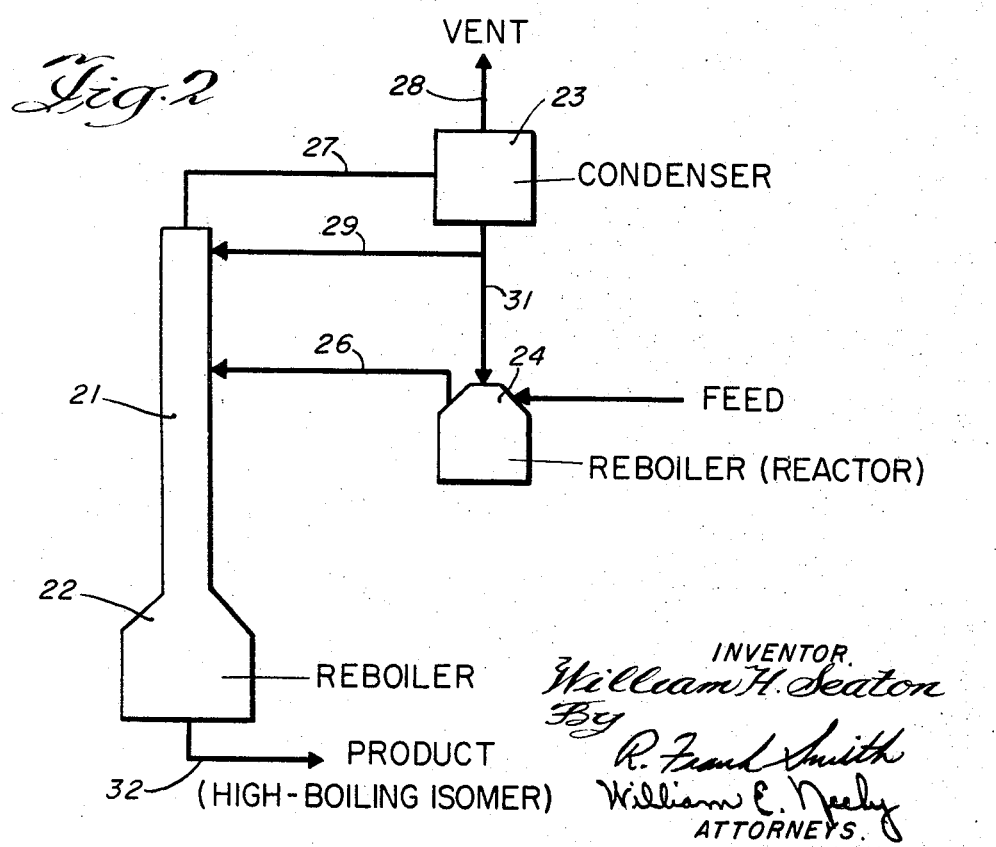

United States Patent Office 3,344,164
Patented Sept. 26, 1967

3,344,164
ISOMERIZATION PROCESS FOR CERTAIN CYCLOHEXANE STEREOISOMERS
William H. Seaton, Kingsport, Tenn., assignor to Eastman Kodak Company, Rochester, N.Y., a corporation of New Jersey
Filed Dec. 7, 1964, Ser. No. 416,424
11 Claims. (Cl. 260—464)

ABSTRACT OF THE DISCLOSURE

The liquid phase isomerization of the trans and the cis isomers of 1,4-cyclohexane derivatives is accomplished by the use of elevated temperatures and strongly basic catalysts.

---

This invention relates to a process for the isomerization of stereoisomers of certain disubstituted cyclohexane derivatives and, more particularly, it relates to a continuous process of isomerization and recovery of a desired isomer from a mixture of isomers.

Disubstituted cyclohexane derivatives can exist in two stereoisomeric forms, the cis form in which both substituent functional groups are located on the same side of the cyclohexane ring, and the trans form in which these substituents are located on opposite sides of the ring, as is well known to those skilled in the art. Although, in general, the stereoisomers of a given compound have similar properties, in some cases, as in the use of these materials to form polymers, it is more desirable to have one or the other of the isomers rather than the equilibrium mixture thereof which usually is obtainable when such products are synthesized by chemical processes. The present invention provides a method of converting an undesired isomer to the desired form in substantially quantitative yield and recovering a substantially pure fraction of the desired isomer.

The invention will be better understood from the following detailed description thereof, taken in conjunction with the accompanying drawings in which:

FIGURE 1 depicts a continuous method for converting one stereoisomer of a disubstituted cyclohexane derivative to the other isomeric form and recovering the latter, when the desired isomer is the lower boiling of the two; and FIGURE 2 depicts a similar continuous process for isomerizing and recovering a desired isomer which is the higher boiling of the two isomers.

In accordance with the invention, I have discovered suitable catalysts for catalyzing the interconversion of the cis isomer to the trans isomer (and vice versa) of certain disubstituted cyclohexane derivatives, specifically, 1,4-cyclohexanedicarbonitrile, 1,4 - cyclohexanebis(methylamine), and 4 - (aminomethyl)cyclohexanemethanol. The invention further provides a continuous process whereby a mixture of the isomers of these cyclohexane derivatives can be substantially completely converted to either desired isomer by a process which involves sequentially or simultaneously converting one isomer to the other and removing the desired isomer from the reaction mixture.

The catalysts which can be used in carrying out the process of the invention are basic materials, specifically, the alkali metals lithium, sodium, and potassium and the oxides (e.g., $Na_2O_2$), cyanides (e.g., $NaCN$), amides (e.g., $NaNH_2$), hydroxides (e.g., $LiOH$), hydrides (e.g., $NaH$), and borohydrides (e.g., $NaBH_4$), of these metals. In general, although any of these catalysts will cause the isomerization to proceed at an appreciable rate, I have found it desirable to use the more basic catalysts for the compounds having the more basic functional groups. For example, although sodium hydroxide readily isomerizes 4 - (aminomethyl)cyclohexanemethanol, the more basic sodamide is desirable for obtaining a substantial isomerization rate for 1,4-cyclohexanebis(methylamine).

As those skilled in the art will appreciate, the rate of isomerization, other things being equal, will depend on the temperature at which the reaction rate is carried out and the amount of catalyst. While these variables have no fixed limits, I have found that, in general, temperatures of 100° C. and higher are satisfactory, with temperatures of about 200–300° C. being preferred. The isomerization can be carried out either in the liquid or vapor phases although temperatures somewhat higher than 300° C. are recommended for conducting the process in the vapor phase. The pressure existing in the reaction zone is not critical, and atmospheric, sub-atmospheric, and super-atmospheric pressures can be used.

The catalysts are used in amounts of at least about 0.1% by weight based on the isomers, with concentrations of about 0.5–5% being generally preferred in most cases. Although higher concentrations can be used, they are usually not necessary to produce the desired isomerization.

In accordance with the invention, when a stereoisomer (i.e., a cis isomer or a trans isomer) or a mixture of such isomers is heated with an effective concentration of catalyst at a fixed temperature, there will result a definite equilibrium concentration of each isomer in the reaction system, regardless of the original concentration of either isomer. Typical equilibrium compositions for mixtures of the cyclohexane derivatives of the invention were determined by agitating both mixtures rich in the cis isomer and mixtures rich in the trans isomer with 2% of catalyst at a constant temperature within the range of the invention and following the approach to the equilibrium composition by gas chromatographic analysis. The equilibrium concentrations are given in the table below.

TABLE 1

| Isomers of— | Composition, Percent Transisomer | Temperature, ° C. |
| --- | --- | --- |
| 1,4-cyclohexanedicarbonitrile | 57.2 | 200 |
| 1,4-cyclohexanebis(methylamine) | 76.7 | 243 |
| 4-(aminomethyl)cyclohexanemethanol | 77.5 | 200 |

In accordance with the invention, the continuous isomerization of the defined cis/trans isomers is combined with the continuous removal from the reaction mixture of a desired isomer, suitably by distillation. Removal of a substantial portion of one of the isomers in this manner disturbs the equilibrium. The isomerization reaction replenishes the proportion of the removed isomer in an attempt to re-establish equilibrium at the expense of the undesired isomer. In this manner, by repeating these steps or carrying out both isomerization and removal simultaneously, substantially all of a given amount of one isomer or a mixture of isomers can be converted to one desired isomer having a purity as high as desired.

Referring to the drawings, FIGURE 1 depicts a continuous or semi-continuous process for converting an isomer of any of the disubstituted cyclohexane derivatives of the invention to the other isomeric form (e.g., cis to trans) and recovering the desired isomer in yields approaching 100% of the combined amounts of cis and trans isomer in a purity as high as desired, assuming that the desired isomer has a lower boiling point than the undesired isomer. As shown in FIGURE 1, a conventional distillation apparatus is employed, comprising a distillation column 10 provided with a reboiler 11 (which also functions as an isomerization reactor). Line 12 leads from the top of the distillation column 10 to a condenser 13 provided with line 14 leading to a vent for removal of noncondensible materials and a line 16 through which the desired low-boiling isomeric product is collected. Line 17 is used for returning a liquid reflux to the column as is necessary for proper operation thereof.

The process can be carried out in a continuous manner in which feed material is supplied to the column through line 18, which is shown as feeding an intermediate point of the column. In accordance with conventional distillation practice, the feed should be introduced in the column at a point at which the composition of the feed approximates that of the material existing in the column at the feed point. Thus, the feed point is variable and may exist at any point on the column or at the reboiler itself.

The reboiler-reactor 11 contains a suitable amount of the desired catalyst in accordance with the invention and the pressure conditions existing in the column are chosen such that the temperature in the reboiler is effective to carry out the desired isomerization. Similarly, flow rates should be set such that the average residence time in the reactor is sufficient to permit substantial isomerization to occur.

From the description of the invention which has been given, it will be apparent that the isomerization reaction which goes on in the reboiler 11 tends to replace the low-boiling product which has been removed through line 16, at the expense of the higher-boiling isomer. Rectification of the isomeric mixture of vapors passing up column 10 occurs in the usual manner to produce a final product having any desired degree of purity consistent with the rectification ability of the column itself and the reflux ratio supplied through line 17.

For operation in a semi-continuous manner, all of the charge material is fed into reboiler 11 at the beginning of the distillation, and the process is carried out until substantially all of the charge material has been converted to the desired isomer and recovered. It will be seen that, becaue of the simultaneous conversion of the high-boiling to the low-boiling isomer, semi-continuous operation in this manner eliminates to a large extent the customary increasing difficulty in making a desired separation which is characteristic of batch distillations. In carrying out the process in accordance with the invention, the separation requirement imposed on the distillation column remains approximately constant throughout the process.

In FIGURE 2, there is depicted a schematic representation of suitable apparatus for carrying out an isomerization and separation where the desired isomer is the higher boiling one. The apparatus consists of a distillation column 21 provided with a reboiler 22, a condenser 23, and reboiler-reactor 24. As shown, the feed is introduced into the reboiler-reactor 24 which contains the isomerization catalyst. Vapors from the reboiler-reactor are introduced through line 26 to an appropriate point in the distillation column. Vapors of the low-boiling component leaving the column through line 27 are condensed in condenser 23 which is provided with line 28 leading to a vent for noncondensible materials in the stream. Leaving condenser 23, the liquid low-boiling isomer is split in two fractions, one being reintroduced as liquid reflux into the column 21 through line 29, and the other being returned through line 31 to reboiler-reactor 24. The desired high-boiling product, having been stripped to any desired degree of the low-boiling isomer, collects in reboiler 22 from which a product stream is removed through line 32. It will be seen that the low-boiling stream leaving condenser 23 is converted in reboiler-reactor 24 to a mixture of low- and high-boiling isomers from which the high-boiling product is removed in column 21. The rising stream of low-boiling isomer is again condensed in condenser 23 and returned to reboiler-reactor 24 for further conversion into a mixture of low- and high-boiling isomers. In this way, substantially all of the feed material can be converted to the desired high-boiling isomer and recovered as such, the purity thereof being limited only by the fractionating efficiency of the column and the operating conditions thereof.

The continuous isomerization and recovery of a desired isomer in accordance with the invention are illustrated by the following examples.

EXAMPLE I

A 1,000 g. charge of 1,4-cyclohexanedicarbonitrile constiting of 570 g. of the trans isomer and 430 g. of the cis isomer was charged into the reboiler of an apparatus illustrated by FIGURE 1. To this charge was added 10 g. of $KBH_4$. The distillation column had approximately 7 theoretical plates. The system pressure was adjusted to approximately 20 mm. Hg at which pressure the refluxing system maintained a temperature of approximately 250° C. in the reboiler. With a reflux ratio 6/1, 920 g. of distillate were recovered from the system, and this distillate was found to be 95% trans isomer and 5% cis isomer.

EXAMPLE II

A 1,000 g. charge of 1,4-cyclohexanebis(methylamine) consisting of 960 g. of the cis isomer and 40 g. of the trans isomer was charged into the reboiler of an apparatus illustrated by FIGURE 1. To this charge was added 10 g. of sodium metal. The distillation column had approximately 20 theoretical plates. The system pressure was adjusted to approximately 20 mm. Hg, at which pressure the refluxing system maintained a temperature of approximately 130° C. in the reboiler. With a reflux ratio of 20/1, 900 g. of distillate were recovered from the system, and the distillate was found by gas chromatography to be 95% trans isomer and 5% cis isomer.

It will be apparent that the process of the invention involves the two steps of heating an undesired isomer, either alone or in admixture with the desired isomer, with a suitable catalyst to enhance the proportion of desired isomer in the reaction system, removing a substantial proportion of the desired isomer from the reaction zone, again isomerizing to enhance the concentration of desired isomer in the depleted mixture, and so on. These steps can be carried out sequentially or, preferably, simultaneously, as discussed above. The first step in this sequence may be either removal of a portion of the desired isomer, i.e., when the starting material contains a greater proportion of the desired isomer than that which exists in an equilibrium mixture thereof, or isomerization when the concentration of desired isomer is less than the equilibrium concentration. In the accompanying claims, it should be understood that no priority in time between these steps is intended, and either of them may be the initial step in a given process, depending on the nature of the feed material.

The foregoing detailed description has been given for clearness of understanding only, and no unnecessary limitations should be understood therefrom, as modifications will be obvious to those skilled in the art.

What is claimed is:

1. A liquid phase method for converting a cis or trans isomer of a disubstituted cyclohexane derivative selected from the group consisting of 1,4-cyclohexanedicarbonitrile, 1,4-cyclohexanebis-(methylamine) and 4-(aminomethyl) cyclohexanemethanol, to the other of said isomers, which comprises heating a single isomer or an admixture of said isomers to a temperature within the range of 100–300° C. in the presence of 0.1%–5%, based on the weight of the isomeric material, of a basic catalyst soluble in the reaction medium and selected from the group consisting of lithium, potassium, sodium, and the oxides, cyanides, amides, hydroxides, hydrides, and borohydrides of lithium, potassium, and sodium, whereby a mixture of the cis and trans isomers is formed and withdrawing the desired isomer from the mixture of isomers.

2. The process of claim 1 wherein the heating step and the step whereby the desired isomer is withdrawn from the mixture of isomers are carried out simultaneously.

3. A liquid phase method for converting a cis or trans isomer of a disubstituted cyclohexane derivative selected from the group consisting of 1,4-cyclohexanedicarbonitrile, 1,4-cyclohexanebis-(methylamine) and 4-(aminomethyl) cyclohexanemethanol, to the other of said isomers, which comprises distilling a mixture of said isomers at a temperature within the range of 100–300° C. in the presence of 0.1%–5%, based on the weight of isomeric material, of a basic catalyst soluble in the reaction medium and selected from the group consisting of lithium, potassium, sodium, and the oxides, cyanides, amides, hydroxides, hydrides, and borohydrides of lithium, potassium, and sodium, and recovering the desired isomer from the mixture of isomers.

4. The method of claim 3 wherein said cyclohexane derivative is 1,4-cyclohexanedicarbonitrile.

5. The method of claim 3 wherein said cyclohexane derivative is 1,4-cyclohexanebis(methylamine).

6. The method of claim 3 wherein said cyclohexane derivative is 4-(aminomethyl)cyclohexanemethanol.

7. The method of claim 3 wherein said catalyst is sodium.

8. The method of claim 3 wherein said catalyst is potassium.

9. The method of claim 3 wherein said catalyst is sodium borohydride.

10. The method of claim 3 wherein said catalyst is potassium borohydride.

11. The method of claim 3 wherein said catalyst is sodamide.

References Cited

UNITED STATES PATENTS 3,251,874   5/1966   Strickland et al. ____ 260—563 X

JOSEPH P. BRUST, *Primary Examiner.*